(12) United States Patent
Annibale et al.

(10) Patent No.: US 11,824,490 B2
(45) Date of Patent: Nov. 21, 2023

(54) SYSTEM FOR THE INSTALLATION OF PHOTOVOLTAIC PANELS

(71) Applicant: Enel Green Power S.p.A., Rome (IT)

(72) Inventors: Fabio Annibale, Rome (IT); Claudio Bagnoli, Larderello (IT); Ivan Bejar Alcantara, Madrid (ES); Luca Della Santa, Rome (IT); Federico Frontalini, Rome (IT); Daniele Moriello, Larderello (IT); Raffaele Volpe, Naples (IT); Alessandra Conzonato, Pisa (IT); Lorenzo Esposito, Larderello (IT)

(73) Assignee: Enel Green Power S.p.A., Rome (IT)

( * ) Notice: Subject to any disclaimer, the term of this patent is extended or adjusted under 35 U.S.C. 154(b) by 182 days.

(21) Appl. No.: 17/292,346

(22) PCT Filed: Nov. 4, 2019

(86) PCT No.: PCT/IB2019/059439
§ 371 (c)(1),
(2) Date: May 7, 2021

(87) PCT Pub. No.: WO2020/095172
PCT Pub. Date: May 14, 2020

(65) Prior Publication Data
US 2022/0006421 A1    Jan. 6, 2022

(30) Foreign Application Priority Data

Nov. 8, 2018    (IT) .................. 102018000010146

(51) Int. Cl.
*H02S 30/10*    (2014.01)
*H02S 20/00*    (2014.01)
(Continued)

(52) U.S. Cl.
CPC .............. *H02S 30/10* (2014.12); *H02S 20/00* (2013.01); *H02S 30/00* (2013.01); *F24S 25/40* (2018.05);
(Continued)

(58) Field of Classification Search
CPC .......... H02S 20/00; H02S 30/00; H02S 30/10; F24S 25/40; F24S 2025/804; F24S 2025/6002
See application file for complete search history.

(56) References Cited

U.S. PATENT DOCUMENTS

| 2011/0068244 | A1* | 3/2011 | Hartelius | ............. F24S 25/634 174/138 R |
| 2015/0349166 | A1* | 12/2015 | Reynolds | ............... H02S 40/34 136/251 |

(Continued)

FOREIGN PATENT DOCUMENTS

| DE | 102008052418 A1 * | 4/2010 | ............ F24J 2/5205 |
| DE | 102011012600 A1 | 8/2012 | |

(Continued)

OTHER PUBLICATIONS

International Search Report and Written Opinion issued in International Patent Application No. PCT/IB2019/059439 dated Jan. 7, 2020.

*Primary Examiner* — Jessie T Fonseca
(74) *Attorney, Agent, or Firm* — ArentFox Schiff LLP (57) ABSTRACT

The present invention relates to a supporting system for photovoltaic panels and, in particular, to a supporting beam for photovoltaic panels implemented so that it eases the installation phase thereof, by allowing also the use of robot for the positioning, and at the same time it allows a reduction in production and maintenance costs.

9 Claims, 12 Drawing Sheets

(51) Int. Cl.
*H02S 30/00* (2014.01)
*F24S 25/40* (2018.01)
*F24S 25/60* (2018.01)
*F24S 25/00* (2018.01)

(52) U.S. Cl.
CPC .. *F24S 2025/6002* (2018.05); *F24S 2025/804* (2018.05)

(56) References Cited

U.S. PATENT DOCUMENTS

2017/0314819 A1\* 11/2017 Adriani .................. F24S 25/10
2018/0048259 A1\* 2/2018 Haddock ................ F24S 25/67
2018/0191290 A1\* 7/2018 Guthrie .................. H02S 30/00

FOREIGN PATENT DOCUMENTS

| EP | 2206992 | A2 | | 7/2010 | |
|----|---------|----|----|--------|---|
| EP | 2327942 | A2 | \* | 6/2011 | ............ F24J 2/5211 |
| EP | 2698828 | A1 | \* | 2/2014 | ............ H02S 20/00 |
| JP | H0988280 | A | \* | 3/1997 | |
| JP | 2000064523 | A | \* | 2/2000 | ............ F24S 25/13 |
| JP | 2008208554 | A | \* | 9/2008 | ............ F24J 2/5233 |
| JP | 2010027979 | A | | 2/2010 | |
| WO | WO-2011016498 | A1 | \* | 2/2011 | ............ F24J 2/5233 |
| WO | WO-2011099564 | A1 | \* | 8/2011 | ............ F24J 2/523 |

\* cited by examiner

SYSTEM FOR THE INSTALLATION OF PHOTOVOLTAIC PANELS

This application is a 35 U.S.C. § 371 National Phase of PCT Application No. PCT/IB2019/059439, filed Nov. 4, 2019, which claims priority to Italy Application No. 102018000010146, filed Nov. 8, 2018, the disclosures of which are hereby incorporated by reference herein in their entireties.

TECHNICAL FIELD OF THE INVENTION

The present invention relates to a supporting system for the installation of photovoltaic panels.

It fits in the field of designing and implementing plants with photovoltaic panels, in the field thereof the selection parameters include for example the positioning of panels and the designing of the structures adapted to support them.

In particular, the present invention relates to a system constituted by a supporting beam for photovoltaic panels which, suitably implemented, eases the phase of installing the photovoltaic panels. The integration of the beam-photovoltaic panel system, designed in this way, results to be simplified, becoming thus suitable to the use of robots for assembling the photovoltaic panels, by allowing at the same time the reduction in the production and maintenance costs thereof.

BACKGROUND

Currently, the photovoltaic panels for the production of electrical energy constitute one of the simplest and cheapest solutions to reduce the energy expense.

However, for designing and installing a plant with photovoltaic panels it is necessary to take into consideration several parameters; thereamong the installation of the panels themselves should be noted, which generally has a not negligible impact on the environment wherein the panel plant is installed.

For this reason, much attention is directed both to the production phase of the panel and to the installation phase of the latter. Additional attention is paid on the designing and implementation of the beams acting as support for the panels: they support the weight thereof, guarantee to keep a tilting maximizing the panels' performance and keep the position thereof.

By retracing the last steps of the state of art's development in assembling the photovoltaic panels, a known method of installation of such panels provides the positioning of the panels on the related supporting beams and the relative fastening on the beams themselves. Generally, such fastening is implemented by perforating both elements (beam and panel) with the purpose of allowing the manual insertion of fastening external components thereof, such as for example rivets, screws, bolts, etc.

An additional, nowadays more used, method is the one providing the assembly of hooking devices of the photovoltaic panels on supporting beams. Such devices have to be installed on the structure of the beam and, after positioning a panel on the beam, they implement the function of locking the panel through a mechanism such as for example cams, brackets, gears, levers, etc.

Such known methods, mentioned by way of example, involve some disadvantages.

Firstly, the use of a manual labour force in relation to the task to be performed: the processing to be performed on the beams, the anchoring of the beams to the panels, the installation of the external hooking devices on the beams and the procedures for actuating such devices, are all procedures which require the positioning and installation of the photovoltaic panels on the supporting beams by qualified operators.

Secondly, this involves longer time and higher installation costs, as well as higher costs for producing the beams, which require determined expedients to house such devices and panels.

Some of the known and up to now described methods have additional disadvantages such as: the mechanical complexity of the supporting beams and of the hooking devices installed thereon, the need for performing a manual assembly of such hooking devices, as well as all problems related to the maintenance and the replacement of the hooking devices themselves.

SUMMARY OF THE INVENTION

An object of the present invention is to solve the problems left unsolved by the prior art, by providing a supporting system for photovoltaic panels as defined in claim 1, having a design and an implementation so as to represent the best possible compromise and then to allow a simple assembly of the photovoltaic panels, both in manual and automated mode (through robot). With the present invention, in fact, the activities connected to the in-situ assembly are cut by half, thanks to the fact that suitable beams are used, shaped so as to be able to support, each one, pairs of photovoltaic panels. This evidently reduces the number of beams required for installing a same number of panels.

Additional features of the present invention are defined in the corresponding depending claims.

The present invention involves several and evident advantages with respect to the known art.

In particular it simplifies the phase of fastening the panel to the beam (absence of bolts, rivets, etc . . . ), it eliminates the installation of accessory devices to the beam (levers, cams, brackets, etc . . . ); such simplifications translate into important increases in the installation productivity and thus in the time reduction for constructing the photovoltaic plants.

An additional advantage of the present invention is linked to the fact that it simplifies the possibility of using automated robots to perform a complete automated installation of the panels, so as to replace and reduce the risks linked to the construction site activities of the operators, in particular of the panels' assemblers, the number thereof can be advantageously reduced: it wholly eliminates the need for the application (and maintenance) of external hooking and fastening devices on the structure of the supporting frame, and then on the beams.

Moreover, still an advantage can be found in the substantially less overall mechanical complexity of the photovoltaic plant including frame, supporting beams and photovoltaic panels.

Other advantages, together with the features and the use modes of the present invention, will result evident from the following detailed description of preferred embodiments thereof, shown by way of example and not for limitative purposes.

Upon rationalizing the advantages deriving from adopting the present invention one has to contextualize the solution, that one has to think about the advantages that the reductions in the installation time, the reduction in used material, the reduction in used personnel can have in case of implementation of photovoltaic panels of medium/big sizes the territorial extension thereof is of several hectares.

BRIEF DESCRIPTION OF THE FIGURES

The drawings shown in the enclosed figures will be referred to, wherein:

FIGS. 1A to 2 are views of a beam according to a first embodiment of the present invention;

FIGS. 4A to 5 are views of a beam according to a second embodiment of the present invention;

FIGS. 7A to 8 are views of a beam according to a third embodiment of the present invention.

DETAILED DESCRIPTION OF POSSIBLE EMBODIMENTS OF THE INVENTION

The present invention will be described hereinafter by making reference to the above-mentioned figures.

For the purposes of the discussion, it is to be considered that each photovoltaic PV panel rests upon two supporting beams T of the frame, placed in opposite positions with respect to the PV panel itself, and that each supporting beam T can receive one or more PV panels in the direction of its length.

Moreover, the present invention is devised to be used in support of photovoltaic PV panels equipped with a frame having on opposite sides a "C"-like shape, with slots implemented in sizes and positions so as to cooperate with the beam in the fastening phases. This does not intend to preclude the possibility of implementing frames for such PV panels, not explicitly claimed in the present document, compatible with the herebelow described embodiments.

Under the term "overall structure of the frame" or simply "frame", in the present description any bearing structure is meant comprising plinths, beams and floors having the task of sustaining the weight of buildings and loads (in this discussion, the photovoltaic panels) carried thereby and of discharging it to the ground, by guaranteeing the stability thereof.

Under the term "overturned omega-like profile", a type of section of the supporting beam is meant, characterized in having a profile with the shape, indeed, of an overturned "omega". It is to be noted that, if not expressively designated, beams having equal section for the whole length of the same are considered.

Under the terms "axis line", or "axis of the beam", any trajectory of centre of gravity point of the plane figure, that is of the section of the beam, is meant.

Under the term "longitudinal direction", any direction which is both parallel to the direction of the axis line of the supporting beam and orthogonal to any section of the beam itself is meant.

Under the term "resting portion", any portion of photovoltaic panel is meant devised and implemented with the purpose of inserting on a relative supporting beam, which in a final installation position comes in contact with such beam.

Under the term "terminal end", any wing of the beam is meant detected as longitudinal development of the terminal portions of the generally overturned "omega"-like profile of the supporting beam.

Under the term "plane regions", any surface of the beam is meant, meaning the longitudinal development (in the direction of the length of the supporting beam) of the wings of the generally overturned "omega"-like profile of the supporting beam which, during positioning of the photovoltaic panel, allows the contact with the resting portion of such panel.

Under the term "resting plane", any area is meant belonging to a plane region of any plane defined by any plurality of plane regions, belonging to one or more supporting, coplanar, beams which, during the positioning of the photovoltaic panel, comes in contact with the resting portion of such panel.

Generally, the present description relates to a supporting beam, for installing photovoltaic PV panels, constituted by one single main body.

The main body is characterized by a length and generally has an overturned "omega"-like profile, having two terminal ends made integral with said main body.

The terminal ends are processed so as to include plane regions which define corresponding resting planes for the photovoltaic PV panels to be installed. In other words, a resting plane is detected by one or more coplanar plane regions and it is aimed at offering contact surfaces for the positioning of the photovoltaic PV panel.

Moreover, the shape of the terminal ends is so as to include even two locking elements for each photovoltaic PV panel to be installed. As it will be described hereinafter, the locking elements are obtained directly from the sheet of the beam.

The production of the supporting beam T should have as result one main body which is configured at least partially to deform elastically when it is in contact with the photovoltaic PV panels during the installation phase and, after suitable motion of the PV module, to go back in resting position so as to allow to receive and lock photovoltaic PV panels on the resting planes in a final installation position. Then, the locking is guaranteed by means of inserting the locking elements in corresponding slots on the frames of the photovoltaic panels.

Figure 1A:
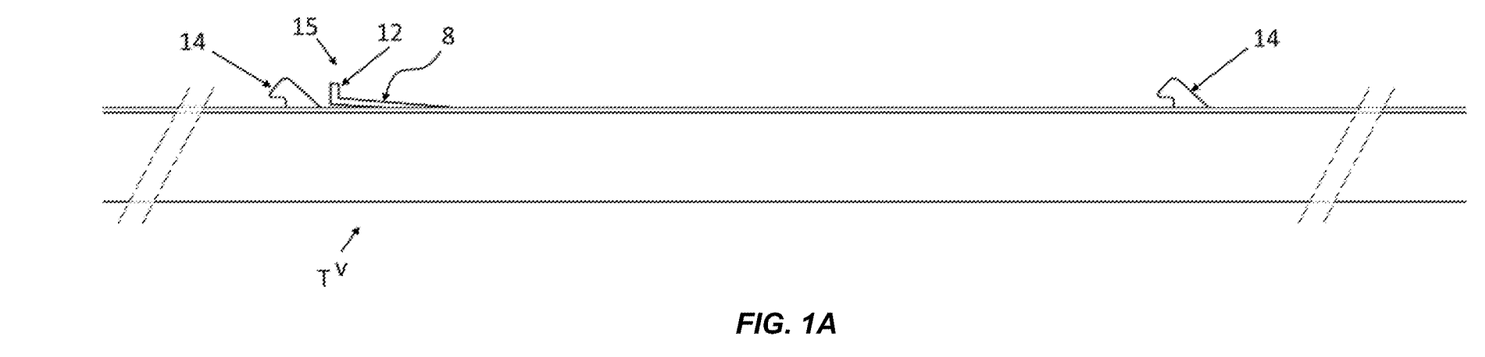
Figure 1B:
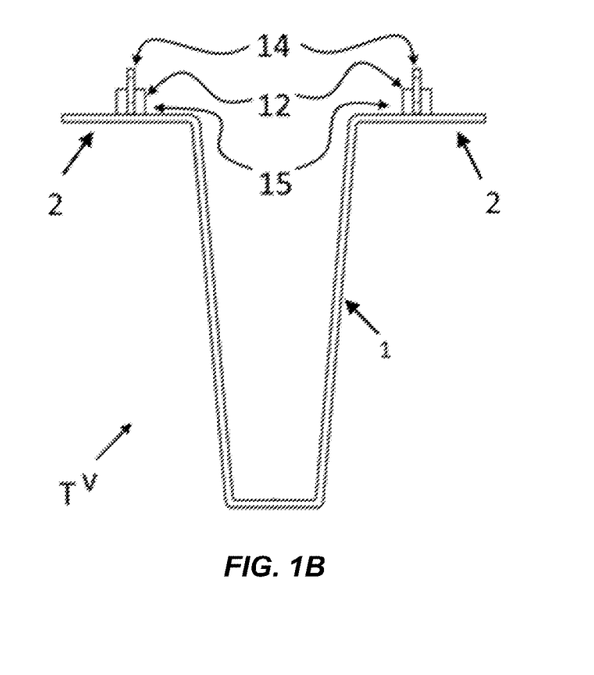
Figure 2:
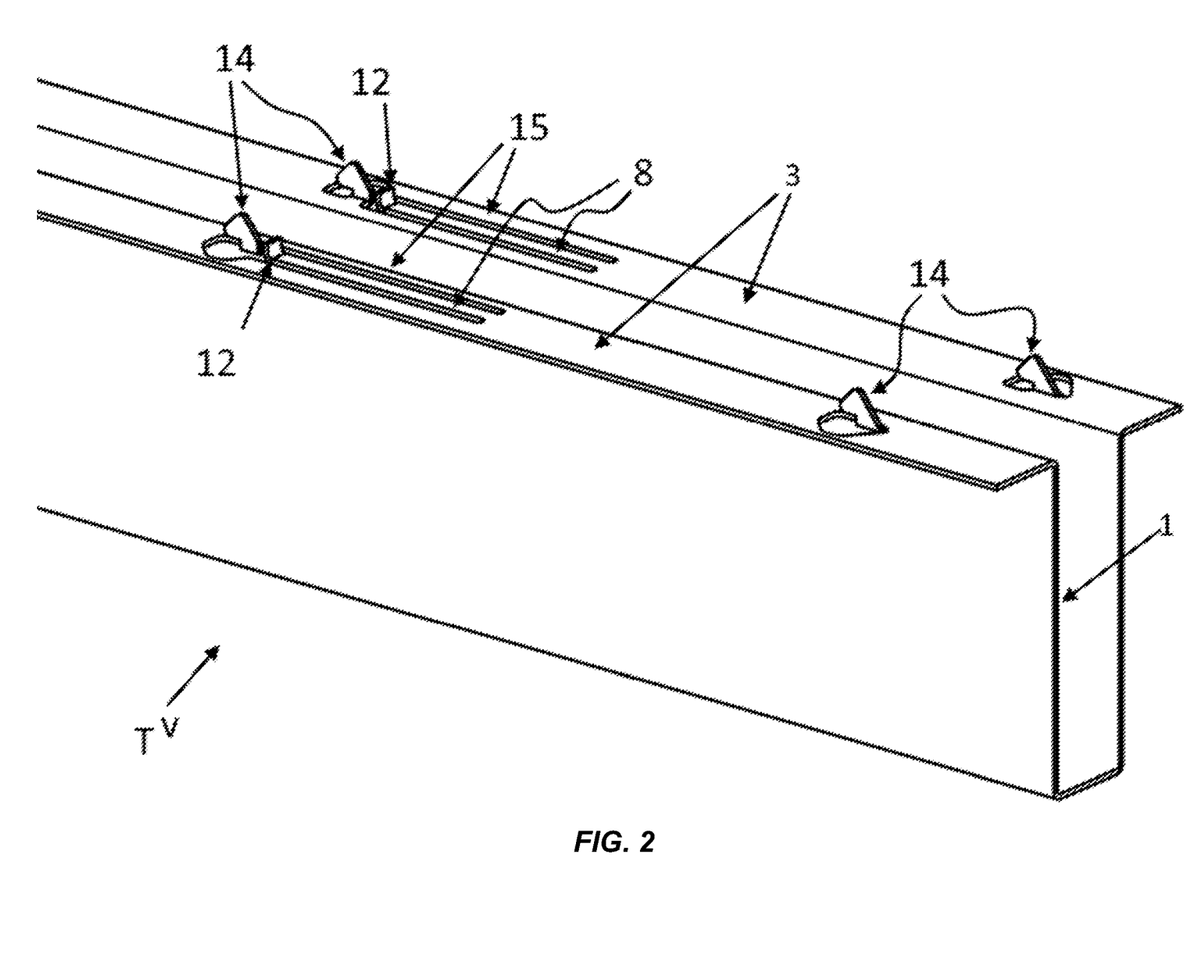

By referring in particular to FIGS. 1A to 3D, a first embodiment for the supporting beam and the related phases of assembling the panel, designated with T$^v$, is described by way of example. In particular, FIG. 1A shows a longitudinal side view of a beam T$^v$ according to this first embodiment, FIG. 1B shows a cross side view. FIG. 2 shows a portion thereof in perspective view.

According to such first embodiment, the beam T$^v$ comprises a main body characterized by a length L and which generally has an overturned "omega"-like profile, with two terminal ends 2 made integral with the main body.

The terminal ends 2 are processed so as to include plane regions 3 which define corresponding resting planes for the photovoltaic PV panels to be installed.

The beam comprises two insertion fins 14 for each photovoltaic panel to be installed thereon, with the purpose of determining the locking of the panel on the beam according to a direction D orthogonal to the plane regions 3.

Each insertion fin 14 is constituted by a first fin, which is obtained, during the production phase of the supporting beam, through procedures of partial cutting and/or folding of a portion of the plane region 3, to form a kind of tooth projecting therefrom.

Advantageously, the beam $T^v$ provides that each terminal end 2 comprises even at least one locking elastic element 8. Each locking element 8 is obtained from main body 1.

Preferably, such locking element 8 is implemented by means of folding process, cutting process or other process, so as to result however integrating portion of the main body 1, and preferably positioned on the plane regions 3.

The locking elements 8 are implemented in the form of a second fin which comprises even an interference portion 12.

Such interference portion 12 is folded so as to insert into a corresponding seat 13 (for example a slot) provided on the photovoltaic PV panel, by performing the locking function along the direction P parallel to the resting plane of the photovoltaic PV panel when it is in the final installation position.

For ease of discussion, the set of the interference portion 12 and of the locking element 8, as just described, will be designated as hybrid element 15.

The beam $T^v$ according to the first embodiment has at least one hybrid element 15, for each terminal end 2. It is to be noted that the hybrid element 15 performs locking functions, according to the direction P parallel to the resting plane of the photovoltaic panel.

Figure 3A:
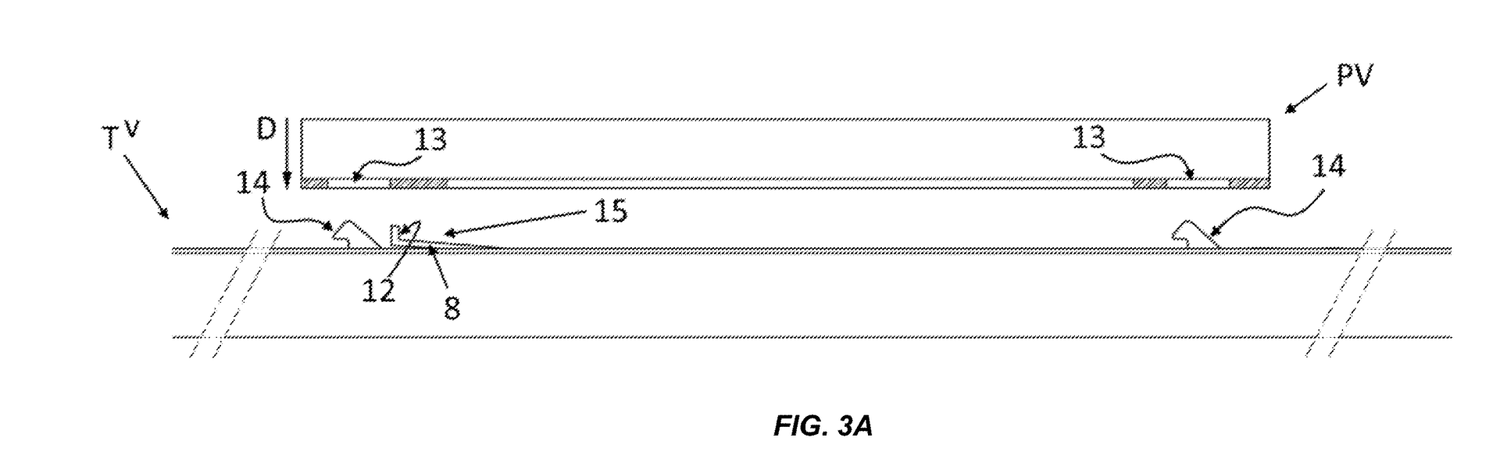
FIGS. 3A to 3D are views in longitudinal section of the phases of assembling a photovoltaic panel on a beam, according to a first embodiment of the present invention.

By making reference to FIGS. 3A a 3D, the just described assembly phases related to the first embodiment are illustrated. In particular, the assembly procedure is illustrated as follows: 3A shows the first phase; 3B the second phase; 3C the third phase; 3D the fourth phase.

FIG. 3A shows the first phase wherein the approaching of the PV panel to the beam $T^v$ takes place according to the direction D orthogonal to the plane regions 3.

Figure 3B:
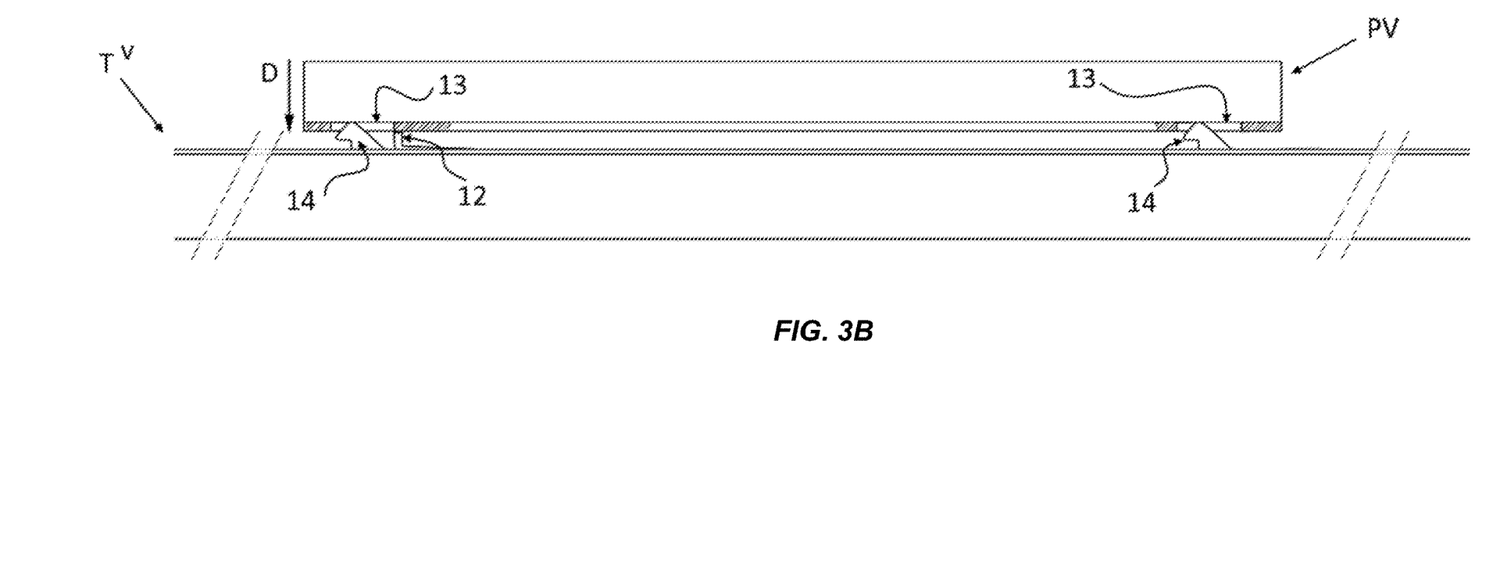

During the second phase, illustrated in FIG. 3B, one or more insertion fins 14 insert in suitable seats 13 provided on the photovoltaic PV panel; at the same time, the hybrid element 15 comes in contact with the frame of the photovoltaic PV panel for the interference portion 12 only.

Figure 3C:
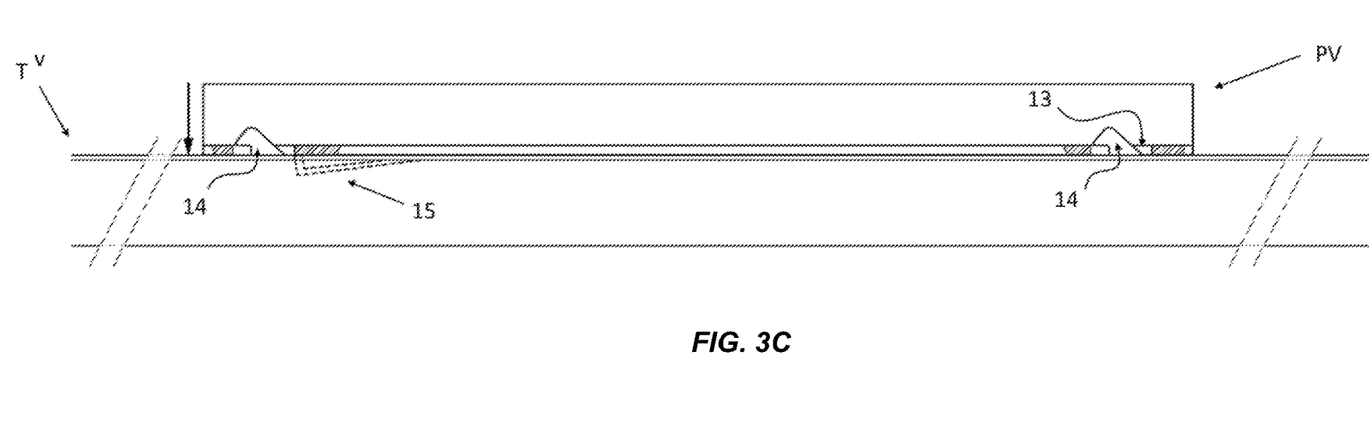

FIG. 3C shows the transition phase, during which the frame of the photovoltaic PV panel has arrived in abutment with the plane regions 3 of the resting plane of the PV panel. At the same time, the hybrid element 15 is pushed downwards, by deforming elastically the relative portion of second fin.

Figure 3D:
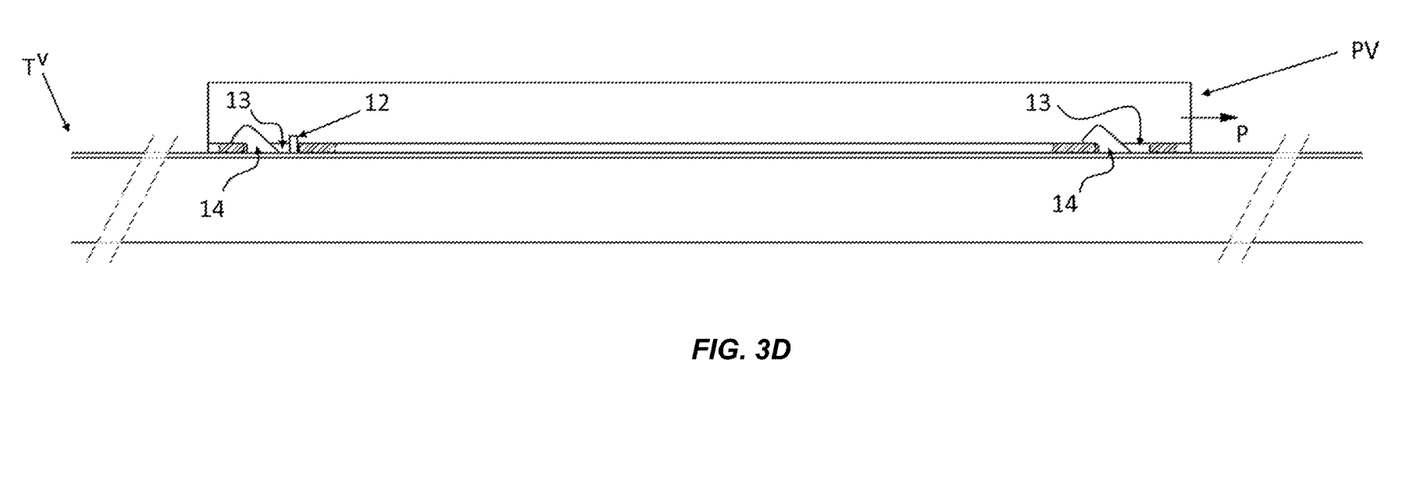

FIG. 3D shows the final phase, during which the PV panel is made to slide according to the direction P parallel to the resting plane of the PV panel. The sliding takes place in the direction wherein the insertion shape of the insertion fins 14 receives the frame of the PV panel, so as to perform the locking according to the direction D orthogonal to the plane regions 3. At the same time, the hybrid element 15, thanks to its elasticity, goes back to the original position; in this configuration, the interference portion 12 is inserted in the seat 13 and locks the sliding thereof according to the direction P parallel to the plane regions 3.

Such phases are made possible by a size of the seat 13 which is shaped so as: firstly, to make the insertion fins 14, but not the interference portion 12 of the hybrid element 15, to be inserted; afterwards, to make such interference portion 12 to be inserted in the seat 13 of the photovoltaic panel after shifting, along the direction P, of the photovoltaic panel which thus results to be in the final position. In this position the panel results to be locked in the motion in all directions thanks to the locking elements 12 and 14 and to the elements 3 of the beam.

Figure 4A:
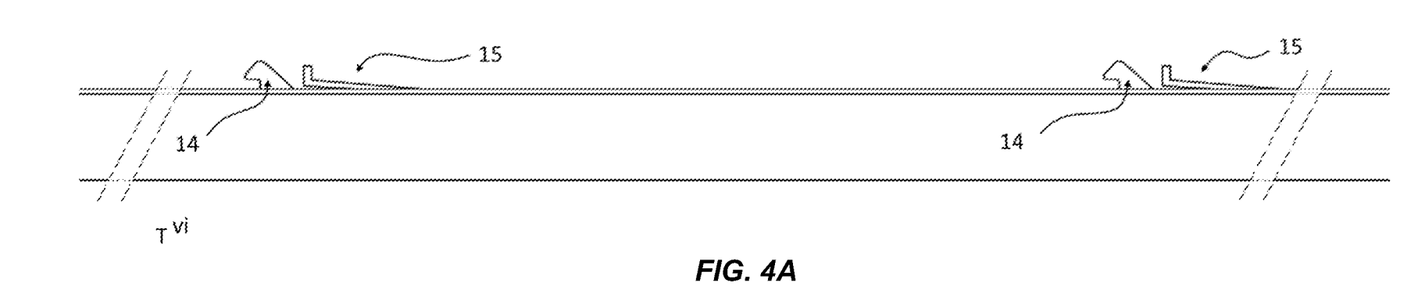
Figure 4B:
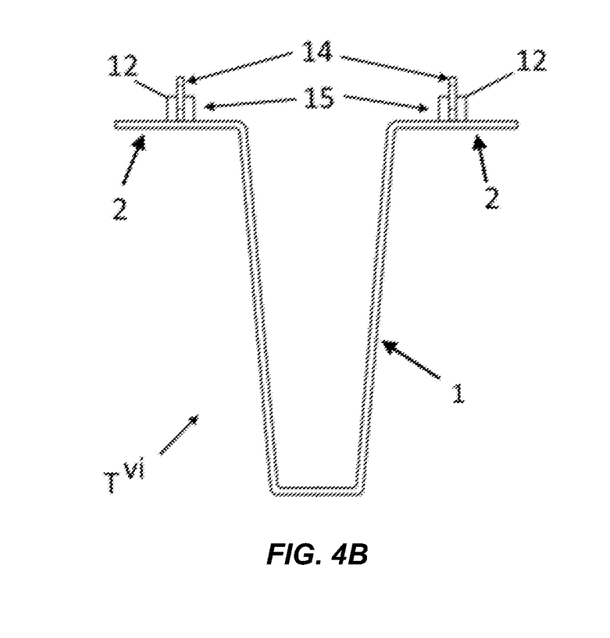
Figure 5:
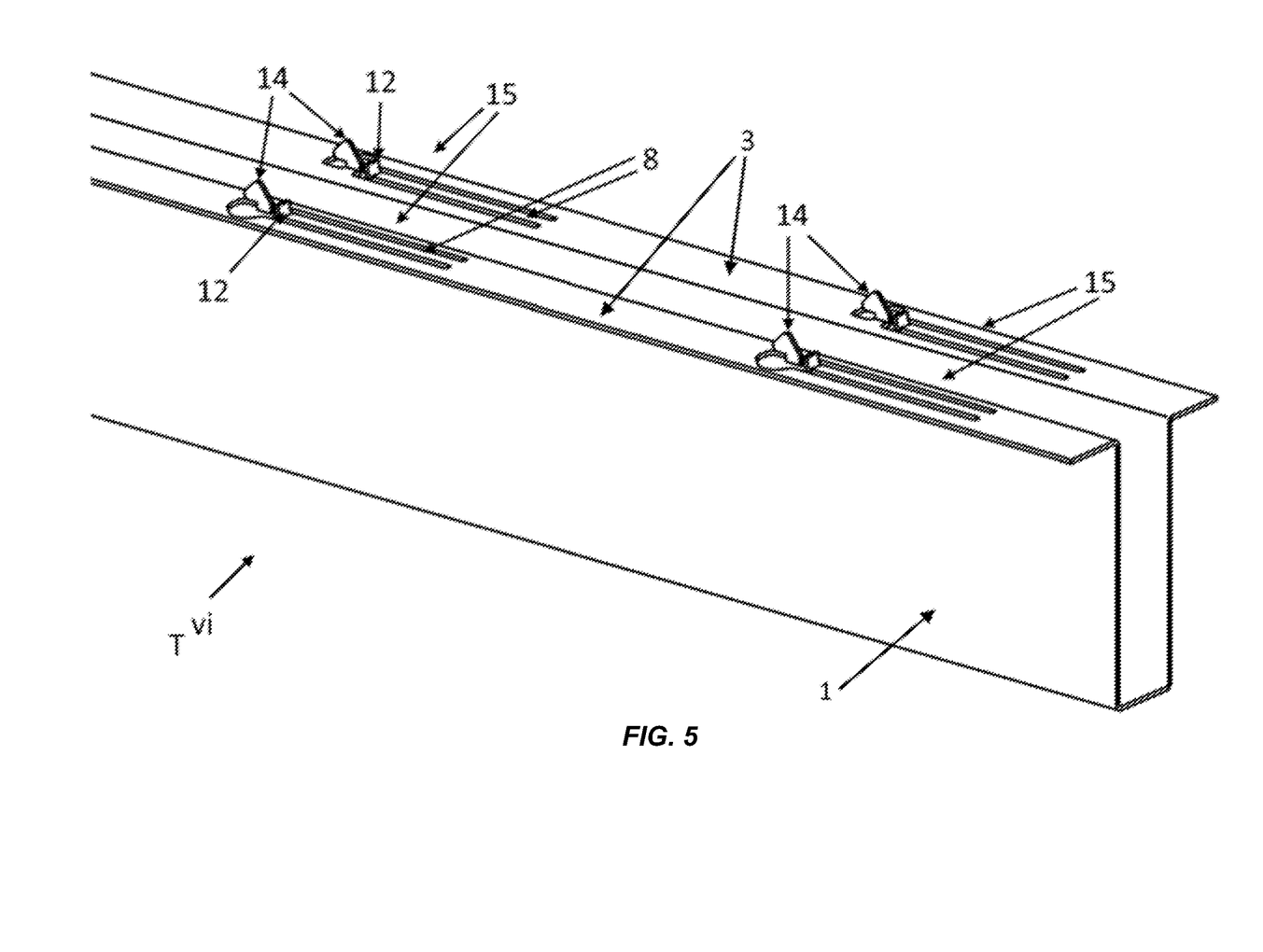

By referring instead to FIGS. 4A to 6D, by way of example a second embodiment of the supporting beam, designated with $T^{vi}$ is described. In particular, FIG. 4A shows a longitudinal side view of a beam $T^{vi}$ according to this second embodiment, FIG. 4B shows a cross side view. FIG. 5 shows a portion thereof in perspective view.

For each terminal end 2, the beam $T^{vi}$ has at least two hybrid elements 15, preferably, but not necessarily, coupled to as many two locking elements in form of insertion fins 14. See in particular FIG. 5.

Such pairs of hybrid elements 15 and insertion fins 14 are advantageously arranged along the ends 2 of the beam so as to maximize the locking of the corresponding PV panels. For example, they can be arranged along the ends 2 so that on each PV panel during the installation phase, on each side, at least two pairs of hybrid element-insertion fin 15-14 act.

By referring to FIGS. 6A to 6D, the just described assembly phases related to the second embodiment are illustrated. In particular, the assembly procedure is illustrated as follows: 6A shows the first phase; 6B the second phase; 6C the third phase; 6D the fourth phase. 6A shows the first phase wherein the approaching of the PV panel to the beam $T^{vi}$ takes place according to the direction D orthogonal to the resting plane of the PV panel.

Figure 6A:
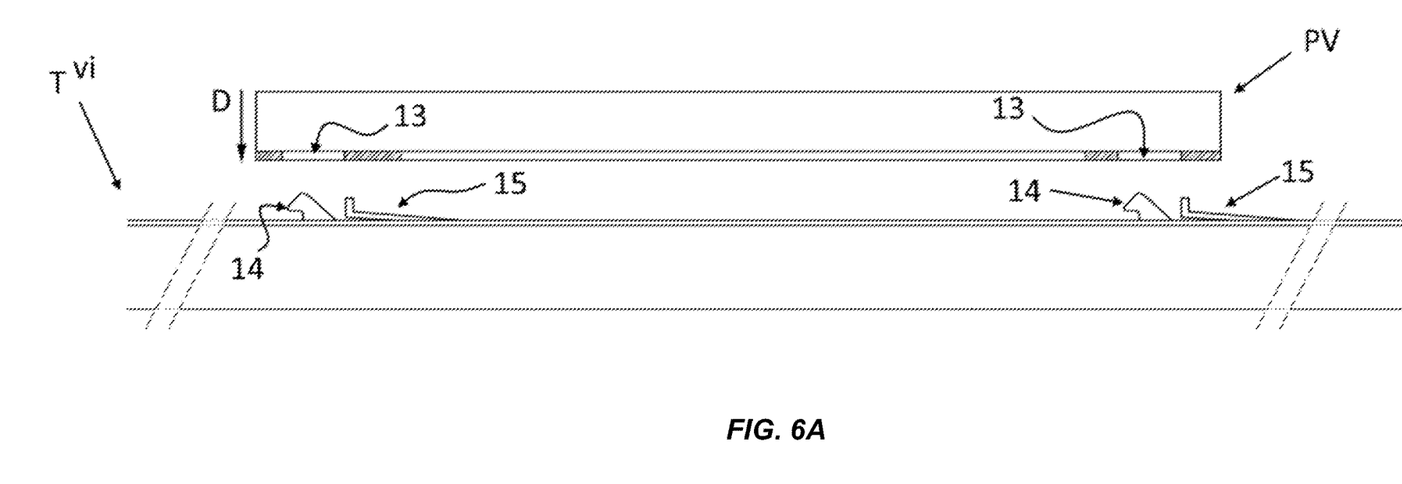
FIGS. 6A to 6D are views in longitudinal section of the phases of assembling a photovoltaic panel on a beam, according to a second embodiment of the present invention.
Figure 6B:
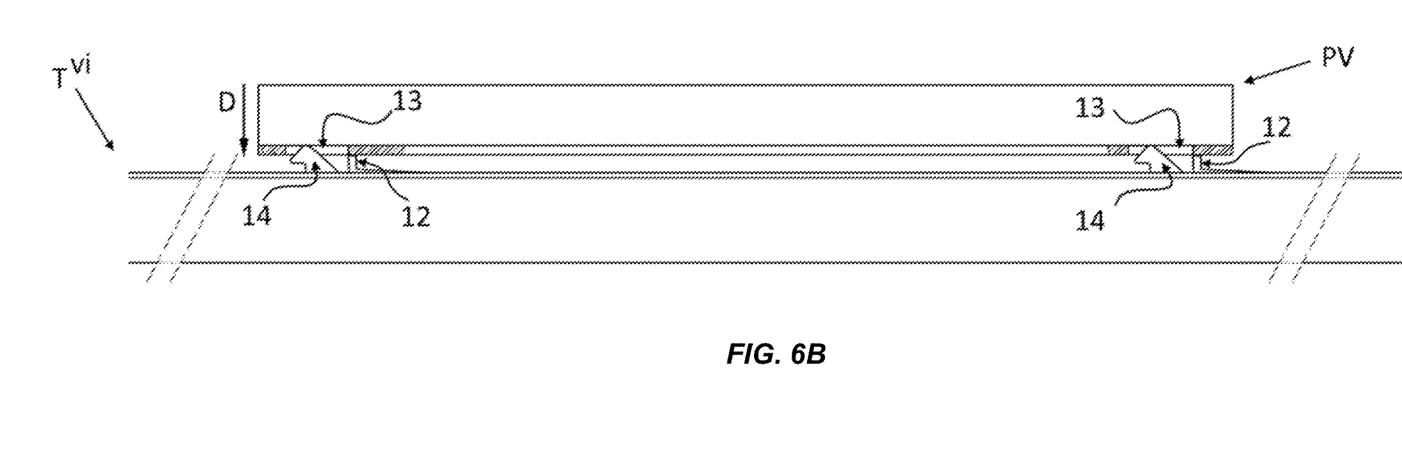

During the second phase, illustrated in FIG. 6B, a plurality of insertion fins 14 inserts in corresponding seats 13 provided on the photovoltaic PV panel; at the same time, a plurality of hybrid elements 15 comes in contact with the frame of the photovoltaic PV panel by means of the relative interference portions 12 only.

Figure 6C:
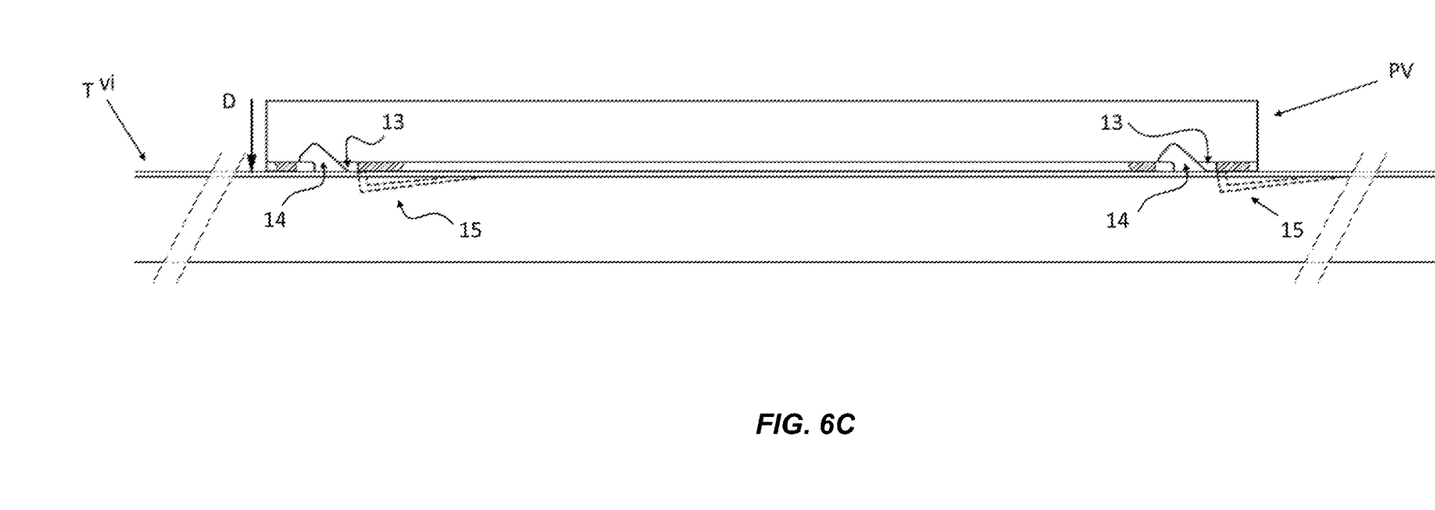

FIG. 6C shows the transition phase, during which the frame of the photovoltaic PV panel has arrived in abutment with the plane regions 3. At the same time, the hybrid elements 15 are pushed downwards, by deforming elastically the relative portions of second fins.

Figure 6D:
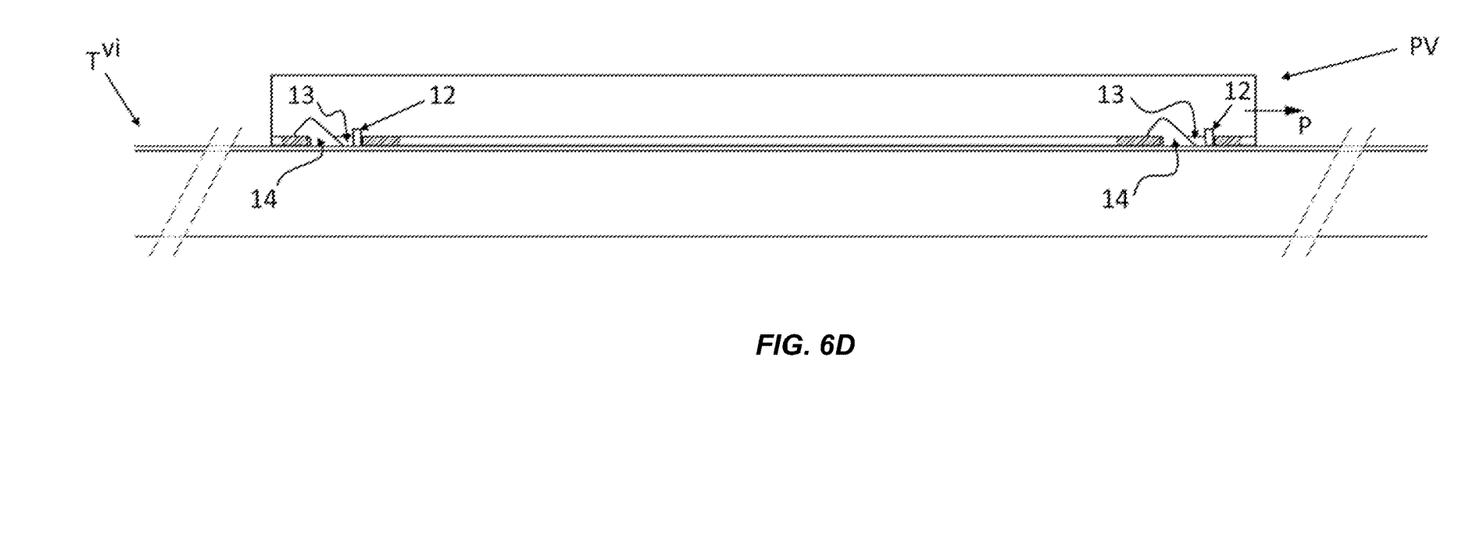

FIG. 6D shows the final phase, during which the PV panel is made to slide according to the direction P parallel to the resting plane of the PV panel. The sliding takes place in the direction wherein the insertion shape of the insertion fins 14 receives the frame of the PV panel, so as to perform the locking according to the direction D orthogonal to the resting plane of the PV panel. At the same time, the hybrid elements 15 go back to the original position; in this configuration, the interference portions 12 are inserted in the seats 13 of the PV panel and lock the sliding thereof according to the direction P parallel to the plane regions 3.

Such phases are made possible by a size of the seat 13 which is shaped so that: firstly, to make the insertion fins 14 but not the interference portions 12 of the hybrid elements 15 to be inserted; afterwards, to make such interference portions 12 to be inserted in the seats 13 of the photovoltaic panel after shifting, along the direction P, of the photovoltaic panel which thus results to be in the final position. In this position the panel results to be locked in the motion in all directions thanks to the locking elements 12 and 14 and to the elements 3 of the beam.

Figure 7A:
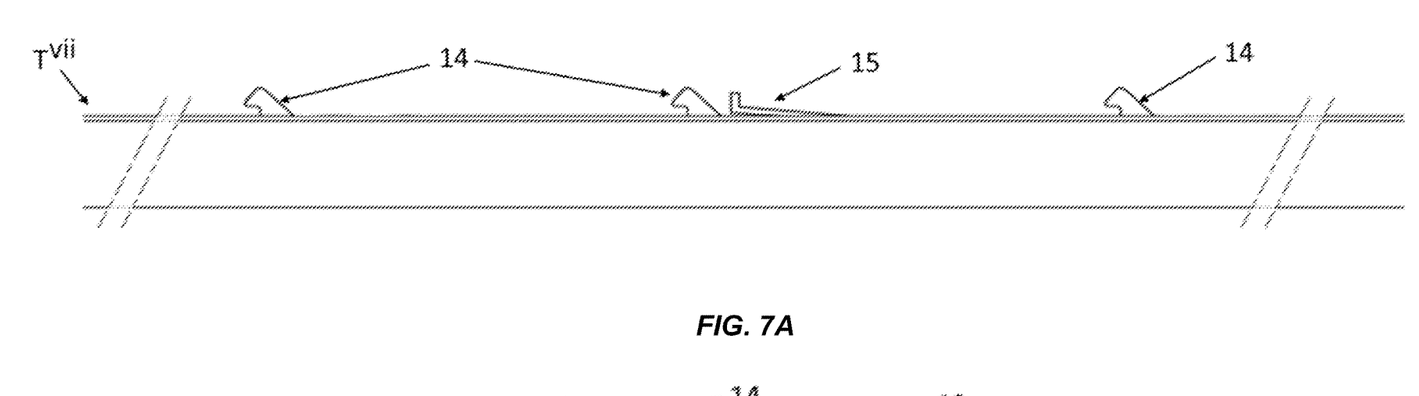
Figure 7B:
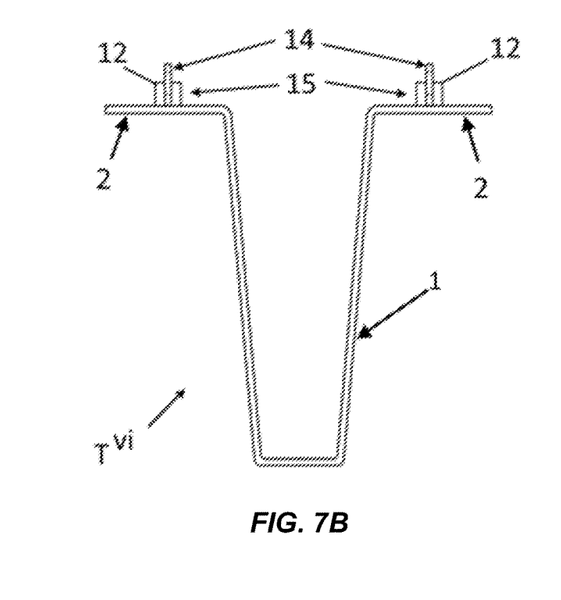
Figure 8:
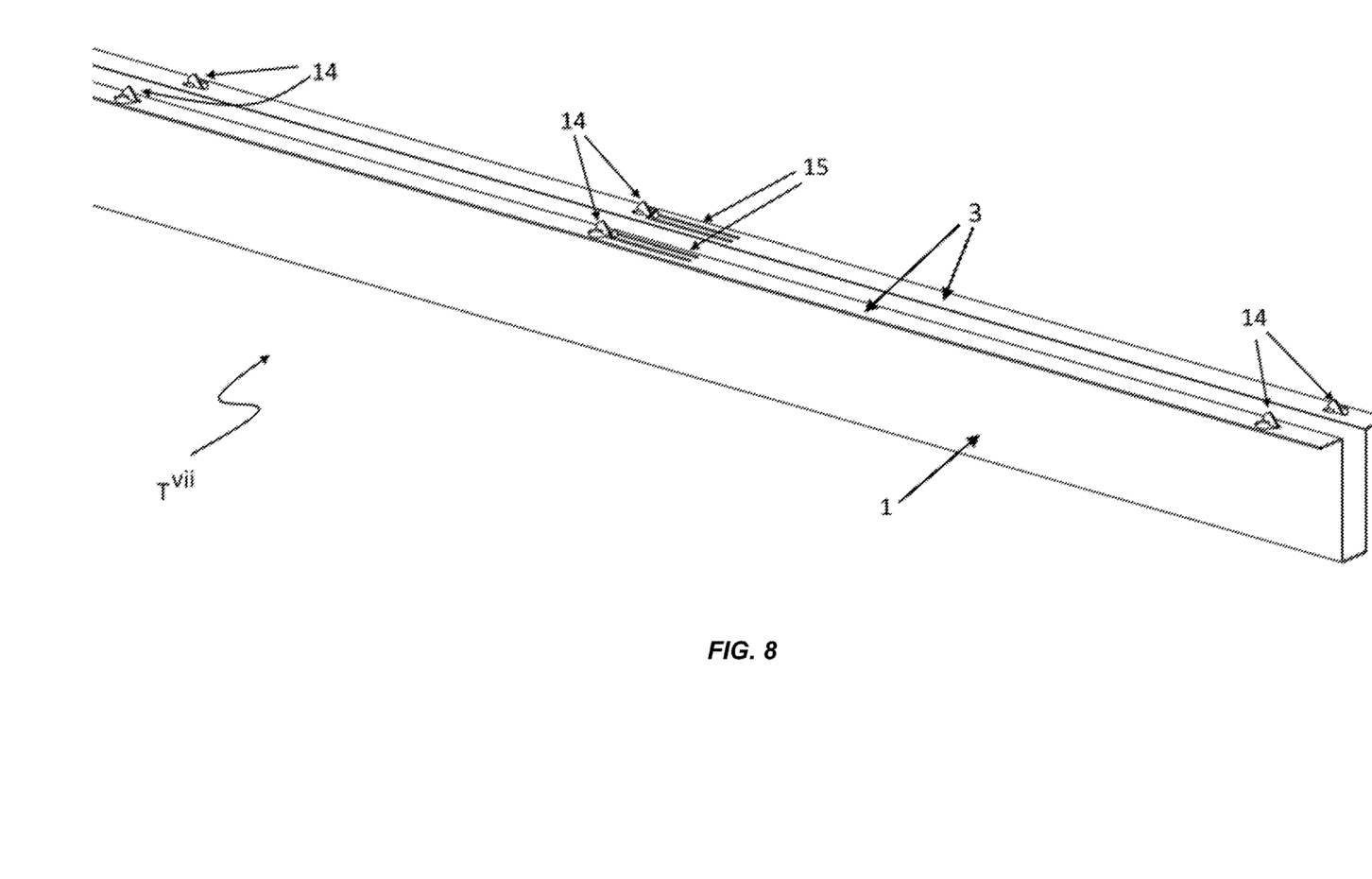

By referring to FIGS. 7A to 9B, a third embodiment of a beam according to the invention, designated with $T^{vi}$, will be described hereinafter. In particular, FIG. 7A shows a longitudinal side view of a beam $T^{vii}$ according to this third embodiment, FIG. 7B shows a cross side view. FIG. 8 shows a portion thereof in perspective view.

It is to be noted that the above-described locking elements are devised to install easily the PV panels but even to allow the disassembly thereof just as easily and quickly.

Even such third embodiment of the present invention provides that the insertion fins 14 can be obtained through partial cutting and/or folding of a corresponding portion of plane region 3, and they can project therefrom. As already described, each insertion fin 14 assumes advantageously an overturned "L"-like shape with respect to the plane region 3, or however it can be shaped so as to receive a portion of photovoltaic PV panel when this is in the final installation position; in this way, it implements the locking of the PV panel according to the direction D orthogonal to the plane regions 3.

In order to fulfil effectively the locking function, the beam $T^{vii}$ comprises at least three insertion fins 14 (three locking elements) on each terminal end 2 thereof. In this way, the stop level of the PV panel on the beam $T^{vii}$ is increased and the holding force is re-distributed on several points with consequent less stress of the material of the beam and of the panel.

As already described with reference to other embodiments, even the beam $T^{vii}$ according to the third embodiment can be produced so as to provide at least a second fin (which implements a locking element 8) even comprising a corresponding interference portion 12.

The interference portion 12 is implemented to be folded so as to insert into a corresponding seat 13 (for example a slot) provided on the photovoltaic PV panel, by performing the locking function along the direction P parallel to the resting plane of the photovoltaic PV panel when this is in the final installation position.

As for the preceding embodiments, one will continue to designate with hybrid element 15 a locking element 8 implemented as a second fin which comprises an interference portion 12, as already described, to perform a locking function along the direction P shown in the figures.

In particular, the beam $T^{vii}$ according to the third embodiment has at least one hybrid element 15, for each terminal end 2, interposed between three insertion fins 14. It is to be noted that the hybrid element 15 performs locking function, according to the direction P parallel to the resting plane of the photovoltaic PV panel.

Such embodiment couples the insertion fin 14 placed centrally (with respect to the other two fins 14 on a same terminal end 2) and a hybrid element 15, by implementing the locking both according to the parallel direction P and according to the direction D orthogonal to the resting plane of the photovoltaic PV panel.

By referring to FIGS. 9A to 9D, the just described assembly phases related to the third embodiment are illustrated.

In particular, the assembly procedure is illustrated as follows: 9A shows the first phase; 9B the second phase; 9C the third phase; 9D the fourth phase.

Figure 9A:
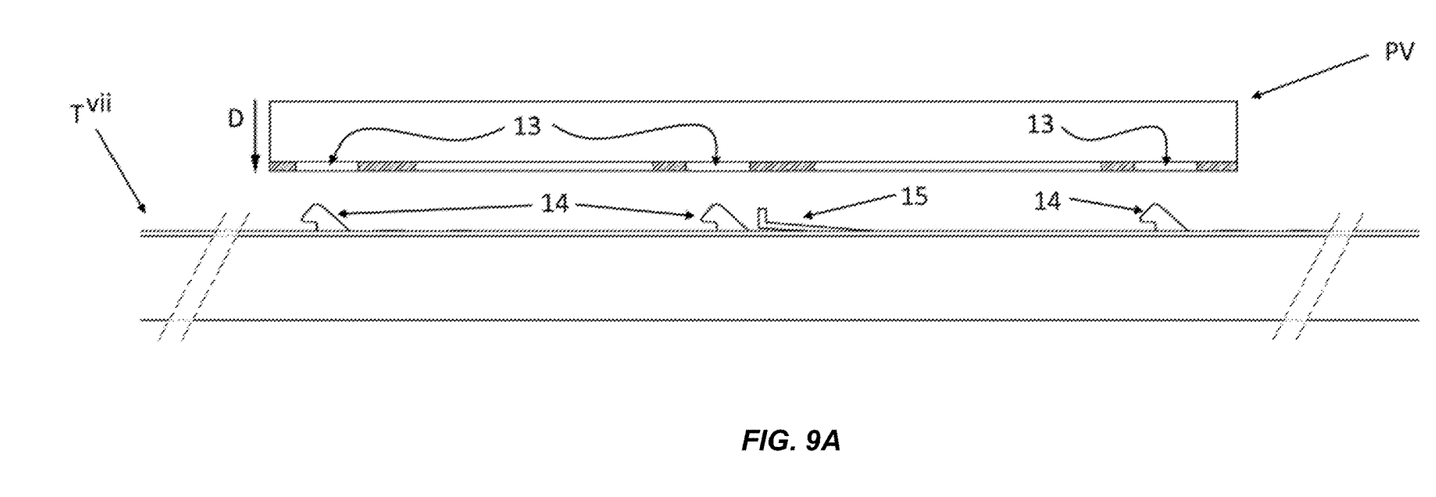
FIGS. 9A to 9B are views in longitudinal section of the phases of assembling a photovoltaic panel on a beam, according to a third embodiment of the present invention.

FIG. 9A shows the first phase wherein the approaching of the PV panel to the beam $T^{vii}$ takes place according to the direction D orthogonal to the plane region 3.

Figure 9B:
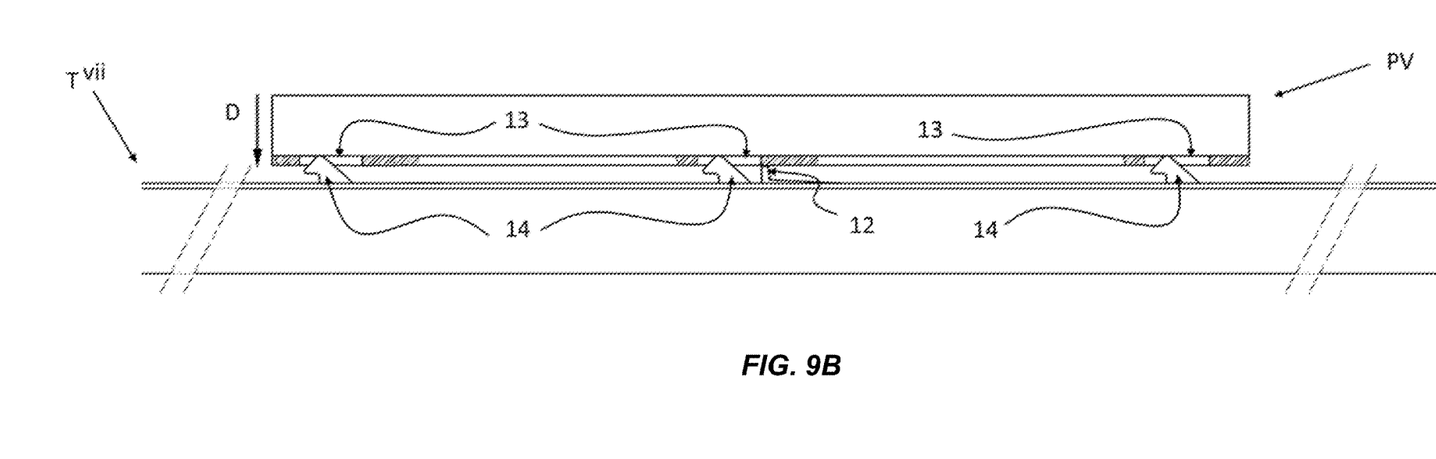

During the second phase, illustrated in FIG. 9B, the three insertion fins 14 insert into corresponding seats 13 provided on the photovoltaic PV panel; at the same time, the hybrid element 15 comes in contact with the frame of the photovoltaic PV panel for the interference portion 12 only.

Figure 9C:
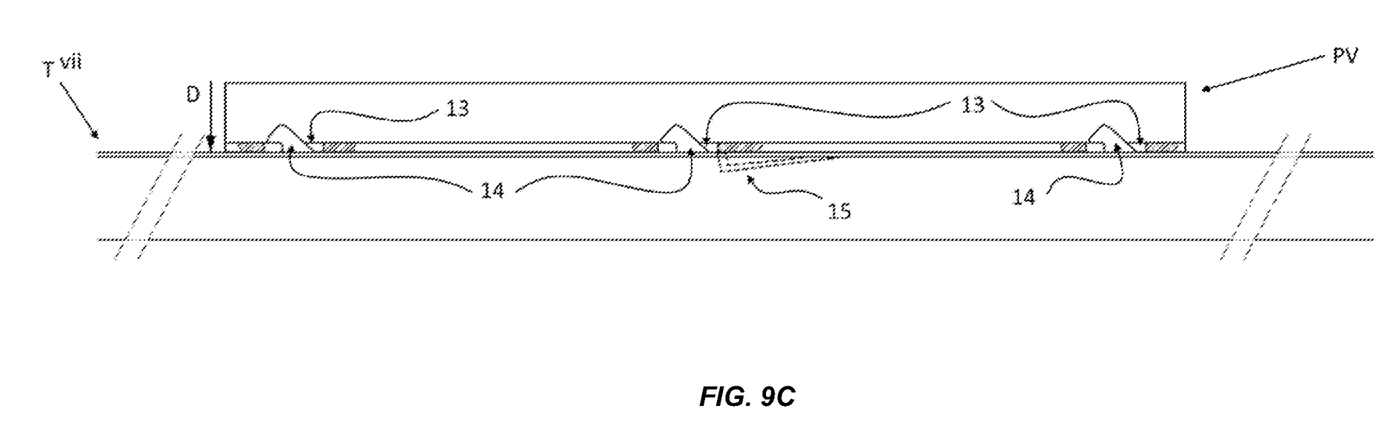

FIG. 9C shows the transition phase, during which the frame of the photovoltaic PV panel has arrived in abutment with the plane regions 3. At the same time, the hybrid element 15 is pushed downwards, the relative portion of second fin deforming elastically.

Figure 9D:
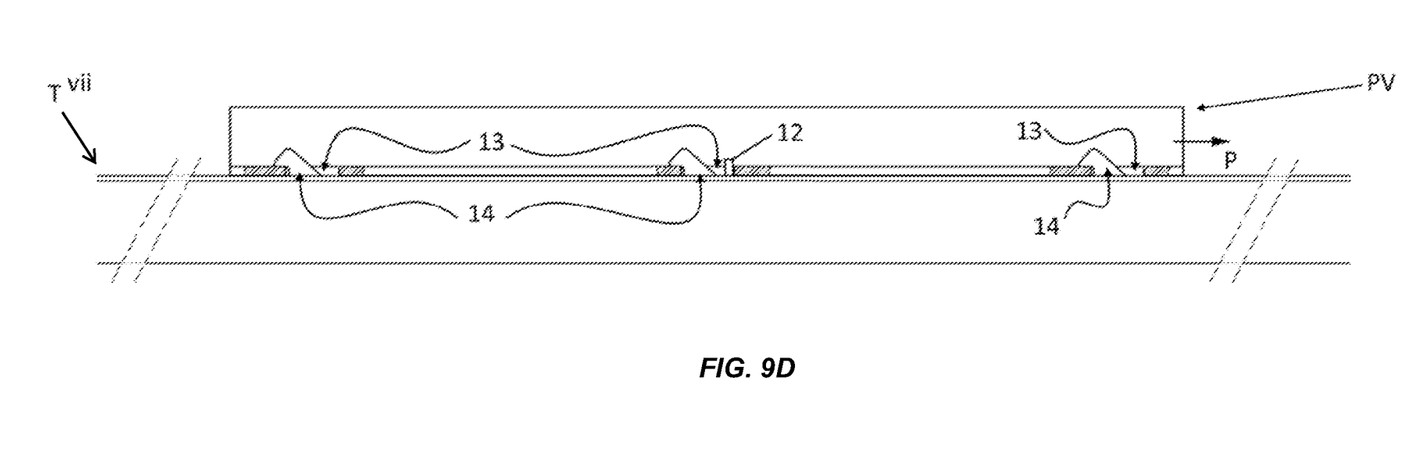

FIG. 9D shows the final phase, during which the PV panel is made to slide according to the direction P parallel to the resting plane of the photovoltaic PV panel. The sliding takes place in the direction wherein the insertion shape of the insertion fins 14 receives the frame of the PV panel, so as to perform the locking function according to the direction D orthogonal to the plane regions 3. At the same time, the hybrid element 15 goes back to its original position; in this configuration, the interference portion 12 is inserted in the seat 13 and locks the sliding thereof according to the direction P parallel to the plane region 3.

Such phases are made possible by a size of the seat 13 which is shaped so as: firstly, to make the insertion fins 14 but not the interference portion 12 of the hybrid element 15 to be inserted; afterwards, to make such interference portion 12 to be inserted after locking the PV panel according to the direction D orthogonal to the resting plane of the photovoltaic PV panel by means of the insertion fin 14.

The present invention has been sofar described with reference to preferred embodiments thereof. It is to be meant that each one of the technical features implemented in the preferred embodiments, herein described by way of example only, can be advantageously combined with other features, even differently from what described, to create additional embodiments, belonging too to the same inventive core and however all within the protective scope of the herebelow reported claims.

The invention claimed is:

1. A system for installation of photovoltaic (PV) panels, comprising:
    at least one photovoltaic panel, and
    at least a supporting beam for the at least one photovoltaic panel, the beam comprising one single main body with length having a U-shaped Channel profile having two terminal ends made integral with said main body,
    wherein said terminal ends are processed so as to include:
        plane regions defining corresponding resting planes for the at least one photovoltaic panel; and
        at least an insertion fin for the at least one photovoltaic panel on said resting planes,
    wherein said main body is at least partially configured to elastically deform when in contact with the at least one photovoltaic panel during installation, to allow receiving and locking the at least one photovoltaic panel on said resting planes in a final installation position,
    wherein said terminal ends comprise at least a locking elastic element configured to lock the at least one photovoltaic panel in said final installation position, each locking elastic element comprising a second fin projecting therefrom, and
    wherein each second fin further comprises an interference portion, adapted to be inserted in a corresponding slot provided on the at least one photovoltaic panel, when the at least one photovoltaic panel is in the final installation position.

2. The system according to claim 1, wherein each one of said locking elastic elements is positioned on one of said plane regions.

3. The system according to claim 1, wherein said insertion fins comprise at least a third fin obtained through partial cutting and/or folding of a corresponding portion of one of the plane regions, and projecting from the one of the plane regions, wherein each insertion fin has an overturned "L" shape with respect to the corresponding plane region, shaped so as to receive a portion of the at least one photovoltaic panel, when the at least one photovoltaic panel is in the final installation position,
    wherein said overturned "L" shape of said insertion fins is configured to lock said photovoltaic panels according to a first direction orthogonal to said resting planes, wherein the photovoltaic panel is configured to move into the final installation position at first according to the first direction orthogonal to said resting planes then according to a second direction parallel to said resting planes towards said insertion fin.

4. The system according to claim 1, comprising for each one of said terminal ends, said at least one insertion fin and a second insertion fin for installation of each photovoltaic panel.

5. The system according to claim 4, comprising for each one of said terminal ends at least one additional locking elastic element interposed between said insertion fin and said second insertion fin.

6. The system according to claim 1, wherein each locking elastic element is implemented as one piece with said main body.

7. The system according to claim 6, wherein each second fin is obtained through partial cutting of a portion of a respective one of the plane regions.

8. The system according to claim 1, wherein each second fin is folded from a respective one of the locking elastic elements.

9. The system according to claim 1, wherein each interference portion inserts in the corresponding slot provided on the at least one photovoltaic panel when the at least one photovoltaic panel is in the final installation position, according to a direction parallel to said resting planes.

* * * * *